ial Patent [19] [11] 3,974,944
Takeuchi [45] Aug. 17, 1976

[54] TONER DISPENSER
[75] Inventor: Osamu Takeuchi, Ebina, Japan
[73] Assignee: Rank Xerox Ltd., London, England
[22] Filed: Oct. 15, 1974
[21] Appl. No.: 514,516

[30] Foreign Application Priority Data
Apr. 18, 1974  Japan.................... 49-42784

[52] U.S. Cl.................... 222/197; 222/200;
222/342; 222/404; 222/DIG. 1
[51] Int. Cl.² ........................... B65G 3/12
[58] Field of Search.......... 222/197, DIG. 1, 404,
222/414, 199–200, 201, 342, 345, 347, 360

[56] References Cited
UNITED STATES PATENTS

| 231,374 | 8/1880 | Taylor | 222/342 X |
|---|---|---|---|
| 287,126 | 10/1883 | Hecker | 222/404 X |
| 858,508 | 7/1907 | Goldman | 222/342 X |
| 1,657,037 | 1/1928 | Ripley | 222/360 X |
| 2,067,583 | 1/1937 | Stark | 222/404 X |
| 2,988,249 | 6/1961 | Wahl | 222/404 |
| 3,542,216 | 11/1970 | Baltz | 222/404 X |
| 3,547,077 | 12/1970 | Sage | 222/DIG. 1 |
| 3,620,423 | 11/1971 | Dalgleish | 222/414 |
| 3,700,142 | 10/1972 | Waibel | 222/200 X |

Primary Examiner—Robert B. Reeves
Assistant Examiner—Charles A. Marmor
Attorney, Agent, or Firm—James J. Ralabate; Clarence A. Green; William A. Henry, II

[57] ABSTRACT

A toner dispenser having a rotatably driven dispensing roll including a cam and cam follower for imparting an axial, vibratory component of motion to the roll. The vibratory motion inhibits agglomerated masses of toner from collecting in the vicinity of the dispensing roll. In those instances wherein the dispensing roll is grooved and the toner dispenser additionally includes a brush-like wiper for dislodging toner particles from the dispensing roll, the vibratory motion also assists in preventing toner from accumulating in the grooved areas of the roll. That tendency is, however, even more effectively counteracted by additionally including a pawl and ratchet indexing arrangement for occasionally changing the alignment between the wiper and the dispensing roll.

3 Claims, 2 Drawing Figures

TONER DISPENSER

BACKGROUND OF THE INVENTION

This invention relates to toner dispensers for electrostatic processors and, more particularly, to methods and means for improving the performance of toner dispensers having rotatably driven dispensing rolls. Even more specifically, the present invention pertains to enhancements for toner dispensers of the type that have a brush-like wiper for dislodging toner particles from a rotatably driven, grooved dispensing roll.

As a general rule, development system for continuous electrostatic processors employ a multi-component developer and include a toner dispenser for adding additional toner to the developer from time-to-time. Some toner is, of course, necessarily consumed in the development process and the additional toner is, therefore, needed to maintain the toner concentration of the developer at a suitably high level.

Unfortunately, conventional toner compositions are tacky, especially when exposed to heat or high humidity. That characteristic is one of the more common sources of problems with toner dispensers. For example, in toner dispensers which have rotatably driven dispensing rolls, agglomerated masses of toner sometimes form so-called bridges in the immediate area of the dispensing roll, thereby interfering with the flow of toner. Additionally, in those toner dispensers which have a grooved dispensing roll for supplying metered amounts of toner and a brush-like wiper for dislodging the toner from the dispensing roll, there sometimes is a tendency for toner to accumulate in the grooved areas of the roll, thereby upsetting the metering action.

SUMMARY OF THE INVENTION

Accordingly, an object of this invention is to provide methods and means for inhibiting agglomerated masses of toner from interfering with the flow of toner from toner dispensers having rotatably driven dispensing rolls.

Another object of the present invention is to provide methods and means for counteracting the tendency of toner to accumulate on rotatably driven, grooved toner dispensing rolls.

To carry out these and other objects of the invention, a toner dispenser having a rotatably driven dispensing roll includes means for imparting an axial, vibratory component of motion to the roll. The vibratory motion inhibits agglomerated masses of toner from collecting in the vicinity of the dispensing roll. In those instances wherein the dispensing roll is grooved and the toner dispenser additionally includes a brush-like wiper for dislodging toner particles from the dispensing roll, the vibratory motion also assists in preventing toner from accumulating in the grooved areas of the roll. That tendency is, however, even more effectively counteracted by additionally including means for occassionally changing the alignment between the wiper and the dispensing roll.

BRIEF DESCRIPTION OF THE DRAWINGS

Still further objects and advantages of this invention will become apparent when the following detailed description is read in conjunction with the attached drawings, in which.

DETAILED DESCRIPTION OF THE ILLUSTRATED EMBODIMENT

While the invention is described in some detail hereinbelow with specific reference to a single illustrated embodiment, it is to be understood that there is no desire to limit it to that embodiment. On the contrary, the intent is to cover all modifications, alternatives, and equivalents falling within the spirit and scope of the invention as defined by the appended claims.

Figure 1:
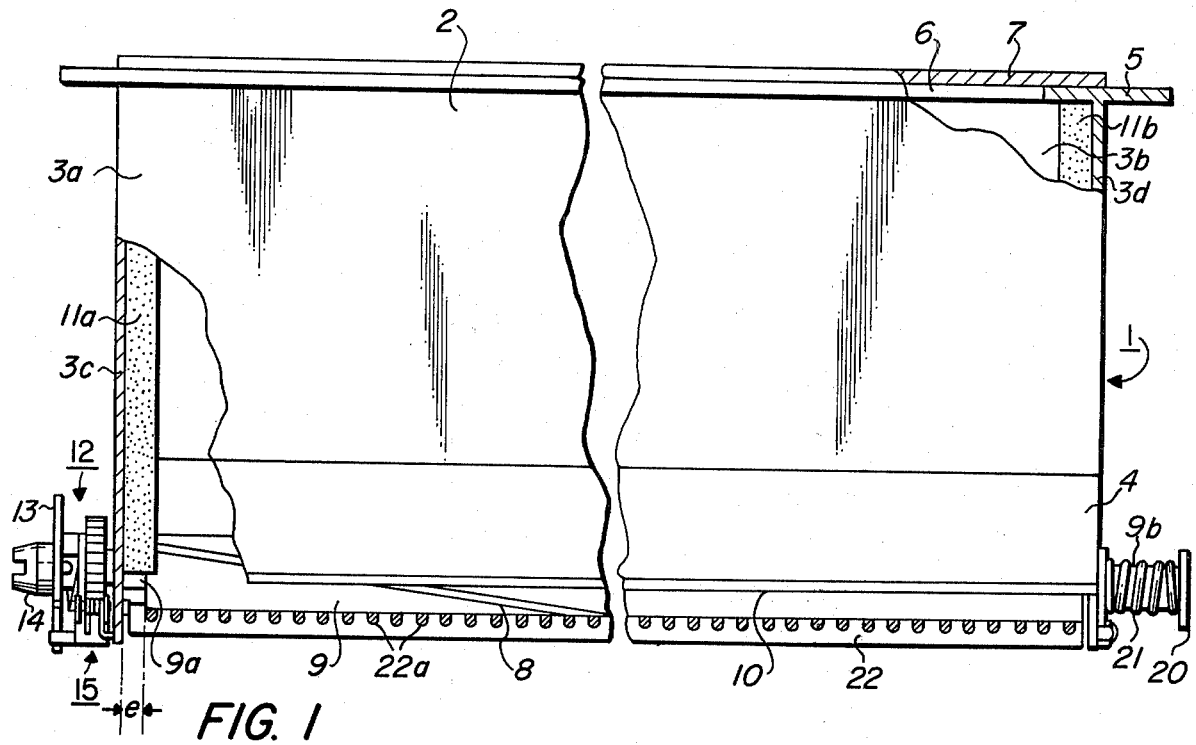
FIG. 1 is a front view of a toner dispenser wherein certain parts have been broken away in the interest of clarity.

Turning now to the drawings, and at this point especially to FIG. 1, it will be seen that there is a toner dispenser 1 comprising a reservoir 2 for storing a supply of toner, a rotatably mounted roll 9 for dispensing toner from the reservoir 2, and an elongated brush-like wiper 22 for dislodging toner particles from the dispensing roll 9.

In keeping with conventional practices, the wiper 22 is mounted adjacent the reservoir 2 and is frictionally engaged with an exposed, full length portion of the circumference of the dispensing roll 9 which, in turn, is partially immersed in the reservoir 2. Consequently, when the roll 9 is rotated in, say, a clockwise direction (as indicated by the arrow A in FIG. 2), successive segments of its circumference are sequentially loaded with toner as they advance through the reservoir 2 and then stripped of toner as they advance past the wiper 22. Typically, of course, the toner stripped from the dispensing roll 9 is gravity fed into the sump of a development system for an electrostatic processor (not shown).

More particularly, as shown, the reservoir 2 has a front wall 3a, a rear wall 3b, and a pair of opposed side walls 3c and 3d. For toner loading purposes, its top 5 has an input port 6 which is covered in operation by a removable cap 7. The dispensing roll 9 is bridged across the bottom of the reservoir 2 and is supported in that position by a pair of axially aligned shafts 9a and 9b which project outwardly from its opposite ends and extend through suitable journals in the side walls 3c and 3d, respectively. Suitably, the lower portions of the front and rear walls 3a and 3b are inclined inwardly toward each other to form a hopper 4 for funneling toner downwardly toward the dispensing roll 9. Separate resilient sealing strips 10 (only the forward one can be seen) are secured to the bottom of the front and rear walls 3a and 3b and extend inwardly therefrom to seal against the surface of the roll 9.

It is noteworthy that the disepensing roll 9 has a helically grooved surface, as at 8, and is rotatably driven to dispense metered amounts of toner from the reservoir 2. These characteristics are especially relevant because experience with other toner dispensers of this same general type demonstrates that there is a tendency (1) for agglomerated masses of toner to collect and ultimately bridge between the front and rear walls 3a and 3b of the reservoir 2 and the dispensing roll 9 and (2) for toner to accumulate in the metering groove 8.

However, in accordance with one of the important aspects of this invention, it has been recognized that both of those tendencies may be at least partially counteracted by imparting an axial, vibratory component of motion to the dispensing roll 9. To provide the axial gap or clearance $e$ necessary to accomodate that motion, the length of the dispensing roll 9 is selected to be somewhat less than the distance between the side walls 3c and 3d. Moreover, there are seals 11a and 11b, each having a thickness in excess of the clearance $e$, on the inner surfaces of the side walls 3c and 3d, respectively, in position to bear against the dispensing roll 9. Those seals prevent toner from flowing around the ends of the roll 9.

Figure 2:
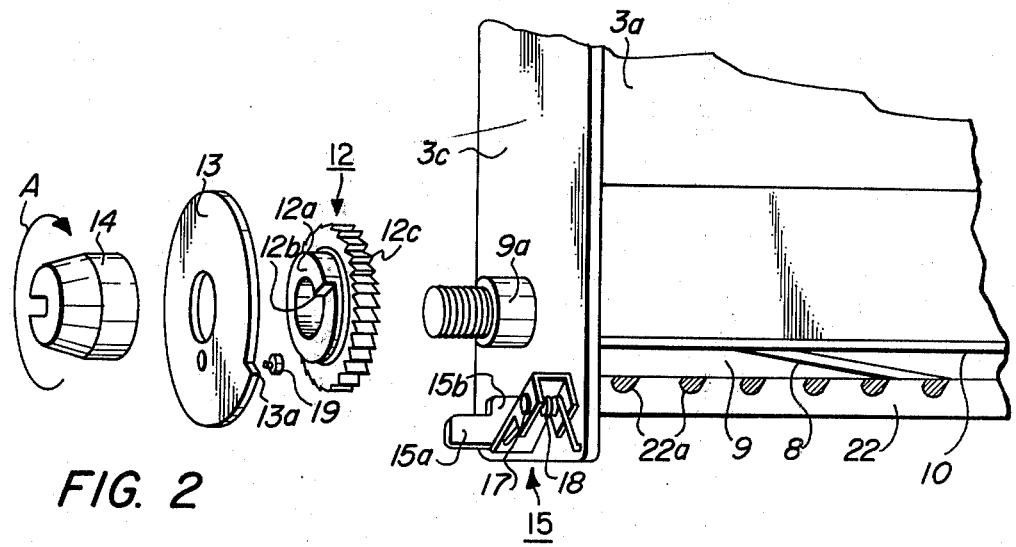
FIG. 2 is a fragmentary, partially exploded view of a drive mechanism constructed in accordance with the present invention for the toner dispenser of FIG. 1.

Referring to FIGS. 1 and 2, for a more detailed consideration of the drive mechanism for the toner dispenser 1, it will be seen that there typically is a coupling 14 threaded on the outer end of the shaft 9a for coupling the dispensing roll 9 to a suitable rotary drive motor (not shown). In keeping with this invention, to impart an axial vibratory component of motion to the dispensing roll 9, there also is a cam follower 19 which is biased into engagement with an axially inclined camming track 12a by, say, a spring 21. Here, the camming track 12a and the follower 19 are supported in facing relationship on a ratchet wheel 12 and a disc 13, respectively, which are positioned on the shaft 9a between the side walls 3a and the coupling 14. The bias spring 21, on the other hand, is retained on the shaft 9b between the side wall 3d and an end cap or flange 20.

The camming track 12a is concentric with the dispensing roll 9 and includes a step-like discontinuity 12b. The ratchet wheel 12 is relatively stationary, but the disc 13 rotates with the shaft 9a. In operation, therefore, the follower 19 rides up the inclined surface of the camming track 12a, thereby shifting the dispensing roll 9 to, say, the right, against the bias supplied by the spring 21. Of course, the follower 19 periodically passes over the return step 12b and the spring 21 then shifts the dispensing roll 9 in the other direction to the left.

As will be appreciated, the vibratory motion of the dispensing roll 9 not only provides a stearing action which tends to break-up any nearby agglomerated masses of toner, but also provides a scrubbing action which assists in working the individual bristles 22a of the wiper 22 into the metering groove 8.

Nevertheless, in accordance with another feature of this invention, means are provided for occassionally varying the alignment between the dispensing roll 9 and the wiper 22 such that the bristles 22a of the wiper 22 engage different segments of the metering groove 8 over a period of time. To accomplish that, as shown, there is a pawl 15 for periodically indexing the ratchet wheel 12 to vary the orientation of the camming track 12a relative to the position of the wiper 22. The pawl 15 includes a follower 15a and a stop 15b and is pivotally mounted on the side wall 3a by a pin 17. Moreover, there is a tension spring 18 connected between the side wall 3a and the pawl 15 for biasing the follower 15a into engagement with a spiral-like camming surface 13a on the outer circumference of the disc 13 and the stop 15b into engagement with one of the teeth 12c on the outer circumference of the ratchet wheel 12.

In operation, progressively increasing radius portions of the camming surface 13a cause the follower 15a to rotate the pawl 15 in, say, a counterclockwise direction against the bias of the spring 18. That, in turn, causes the stop 15b to index ratchet wheel 12 in that same direction as it gradually withdraws from engagement with a given one of the ratchet teeth 12c. Ultimately, the stop 15b is fully retracted and then the radial transition of the camming surface 13a advances past the follower 15a. At that point, the spring 18 urges the pawl 15 in the other or clockwise direction, thereby bringing the stop 15b into engagement with the next adjacent one of the ratchet teeth 12c. This process repeats once each revolution of the dispensing roll 9, whereby the camming surface is indexed once per revolution by an amount equal to the pitch of the ratchet teeth.

CONCLUSION

In view of the foregoing, it will now be understood that provision has been made for enhancing various types of toner dispensers. Specifically, those that have rotatably driven dispensing rolls are less likely to become clogged by agglomerated masses of toner when an axial vibratory component of motion is imparted to the dispensing roll. Those that additionally have a metering groove on the dispensing roll and a brush-like wiper for dislodging toner particles therefrom are less likely to suffer from accumulations of toner in the metering groove if the dispensing roll is axially vibrated. But, that risk may still further be reduced by including means for occassionally changing the alignment between the wiper and the dispensing roll.

What is claimed is:

1. In a toner dispenser having a reservoir and a roll mounted within the reservoir for rotation about a predetermined axis for dispensing toner from the reservoir, the improvement comprising:
    means coupled to said roll for imparting an axial, vibratory component of motion thereto in response to rotation of said roll,
    said roll including a groove for metering toner from said reservoir, and a brush-like wiper frictionally engaged with said roll for dislodging toner therefrom whereby the axial, vibratory motion of said dispensing roll also assists in preventing toner from accumulating in said groove,
    said means including an axially inclined circular cam track centered on the axis of rotation of said roll, and a cam follower biased into engagement with said cam track; one of said cam follower and said cam track being relatively stationary and the other being rotated with said roll, and
    means for varying the alignment between the dispensing roll and the wiper such that the bristles of the wiper engage different segments of the metering groove over a period of time.

2. The toner dispenser of claim 1 wherein said means for varying the alignment between the dispensing roll and the wiper includes a relatively stationary ratchet wheel positioned on said axis, a disc mounted adjacent said ratchet wheel for rotation with said dispensing roll and a pawl responsive to rotation of said disc for periodically indexing said ratchet wheel, said cam track being carried by said ratchet wheel with said cam follower being carried by said disc in facing relationship with said cam track.

3. The toner dispenser of claim 2 wherein said pawl includes a follower and a stop, and said disc having a circumferential spiral-like camming surface, and further including means for biasing said pawl to urge said follower on said pawl into engagement with said camming surface and said stop into engagement with said ratchet wheel, whereby said camming surface causes the stop in said pawl to index said ratchet wheel once each revolution of said dispensing roll.

* * * * *